United States Patent [19]

Butler

[11] 4,175,684
[45] Nov. 27, 1979

[54] MECHANICAL GLASS KNIFE SCORER/BREAKER

[76] Inventor: James K. Butler, 1412 Woodbine Ct., Arlington, Tex. 76012

[21] Appl. No.: 929,856

[22] Filed: Jul. 31, 1978

[51] Int. Cl.² ............................................. C03B 33/02
[52] U.S. Cl. ......................................... 225/2; 83/886; 225/96.5; 225/103
[58] Field of Search ........................ 225/2, 96.5, 103; 83/886

[56] References Cited

U.S. PATENT DOCUMENTS

| | | | |
|---|---|---|---|
| 3,175,745 | 3/1965 | Insolio | 225/96.5 |
| 3,371,833 | 3/1968 | Sutton | 225/2 |
| 3,908,878 | 9/1975 | Blum | 225/96.5 |
| 4,026,262 | 5/1977 | Yasuga | 225/96.5 X |

Primary Examiner—Frank T. Yost
Attorney, Agent, or Firm—Charles W. McHugh

[57] ABSTRACT

An apparatus having utility in microtomy comprising a device for placing a score line on the top surface of a piece of glass plate, and subsequently breaking that glass along a curvilinear plane which encompasses the score line—to produce a Ralph-type knife. The scoring device includes an arm which is movable along an excursion path in a plane which is parallel to the top surface of the glass. A cam-like adjustment is provided to insure that the arm can travel parallel to the glass's top surface. An ancillary device comprises a pair of spaced clamps which are on either side of a rigid fulcrum, such as a piece of drill rod. An index mark (which is preferably movable) is positioned parallel to the fulcrum, and the glass is manually positioned so that the score line is directly over the index mark. Thumbscrews are provided in the top of each clamp to apply sufficient pressure to the glass so as to cause it to fracture in a controlled manner, thereby producing a Ralph-type microtome knife—which may have a cutting length on the order of 2.5 cm long. Preferably, the glass-scoring device and the glass-breaking device share a common base, so as to contribute to a compact, lightweight, and convenient apparatus.

19 Claims, 8 Drawing Figures

MECHANICAL GLASS KNIFE SCORER/BREAKER

This invention relates generally to the field of controlled breakage of a glass plate in order to produce a very sharp edge; more particularly, it relates to the production of Ralph-type knives for use in microtomy.

DESCRIPTION OF PRIOR ART

In 1950, Latta and Hartmann introduced glass knives for microtomes as a substitute for the previously used steel knives; and knives made according to their concept are now commonly known as Latta-Hartmann knives. An example of such a knife is shown in FIG. 2 of U.S. Pat. No. 3,494,521 to Hellstrom. Such knives are usually fabricated by converting a plate of glass (which is usually ¼ inch but may be as much as ½ inch thick) into relatively small squares—with the squares typically having sides about one inch long. These squares are routinely fabricated in a laboratory by the person who expects to use them, using commercially available plate glass. That is, there is no commercial source of pre-fabricated glass knives—as far as is known. At least one reason for the absence of any successful marketing of pre-fabricated glass knives is their propensity of adsorb contaminants from the atmosphere. Indeed, merely leaving a glass knife in a typical biological laboratory for a few hours will cause it to adsorb sufficient contaminants from the air as to render it practically useless, primarily because the chore of cleaning a contaminated knife is so much more difficult than fabricating a new one. It will be understood, therefore, that glass knives have what may be called a relatively short "shelf life", and this has dictated that they be made only a short time before they are to be used in the laboratory.

Usually the glass squares for Latta-Hartmann knives are made by repeatedly scoring and then flexure-fracturing the glass plate; this is routinely accomplished with the aid of a hand-scorer and glazier's pliers. An individual glass square is then scored diagonally from corner to corner across one of the square's faces. The square is next fractured into two triangular pieces by flexing it in a direction perpendicular to the scored line. When the person preparing the knife is skilled in the art of making such knives, a sharp cutting edge is usually produced where the diagonal fracture surface intersects one edge of the glass block. The cutting surface of a Latta-Hartmann knife extends in the thickness direction of the glass block, and ideally is perpendicular to the face of the block.

Some persons are occasionally able to produce a cutting edge which is almost as long as the glass's thickness; but, with the hand-breaking methods of the prior art it is not uncommon for most people to produce a usable edge length that is only about one-fourth of the glass's thickness.

To obviate at least some of the deficiencies of the prior art, mechanical glass-breaking devices have been proposed from time to time; and, examples of such devices may be found in the following U.S. Pat. Nos.: 3,207,398 to Forsstrom and Persson; 3,371,833 to Sutton; 3,819,096 to Pyper; and 3,908,878 to Blum. And, while these inventions may have eliminated some of the vagaries of hand breaking glass knives, they have not been able to solve the inherent "problem" that characterizes Latta-Hartmann knives: the cutting edge is perpendicular to the planar surface of the glass plate—and its length therefore is dependent on the thickness of the glass. In view of the fact that there are practical limits on the thickness of glass plates and hence there are limits on the width (edge length) of Latta-Hartmann knives, it is not surprising that an effort was made to produce a different type of glass knife. In 1976, Dr. H. Stanley Bennett published in "Stain Technology" (Volume 51, No. 2, Pages 71–97) a description of a method for manually fabricating a glass knife which is named for its originator, Dr. Paul Ralph. (A Ralph knife has its cutting edge in the plane of a glass plate's side—not its edge. Hence, in theory, the length of a glass knife of the Ralph type is limited only by the ability to manage a large piece of glass and achieve in it the controlled loading that is essential for a clean break.) Reportedly, Dr. Ralph made his knives some 40 years ago using what may be accurately described as an "impact" method. Regrettably, the "impact" method is said to have been characterized by a very low yield of satisfactory knives and a very large production of glass fragments.

Dr. Bennett improved the manual production of Ralph knives and taught that the knives could be made by fracturing a plate of glass by slowly applying hand pressure on opposite ends of a piece of scored glass which was positioned over a wooden dowel. If a person enjoyed the luxury of an unlimited supply of glass and he had the patience to practice for many hours, it is conceivable that he could achieve a level of skill which at least approximated that of Dr. Bennett. However, for those persons who lack either a very large supply of glass or the determination to eventually succeed—no matter what the cost in time or materials, the technique described by Dr. Bennett is probably of limited value. It should be understood, therefore, that even after Bennett's article appeared, there has remained a need for a highly reliable means for preparing Ralph knives.

Accordingly, it is an object of this invention to provide an apparatus which can be successfully used by relatively untrained persons to produce Ralph knives.

A further object is to provide an apparatus on which a relatively high yield of usable knives is realized from a given quantity of glass plate.

Another object is to provide a compact and durable apparatus for making Ralph knives, and for eliminating most—if not all—of the personal judgments which have heretofore been required in fabricatng Ralph knives.

These and other objects will be apparent from a reading of the specification and claims appended hereto, along with reference to the drawing appended hereto in which:

Figure 1:
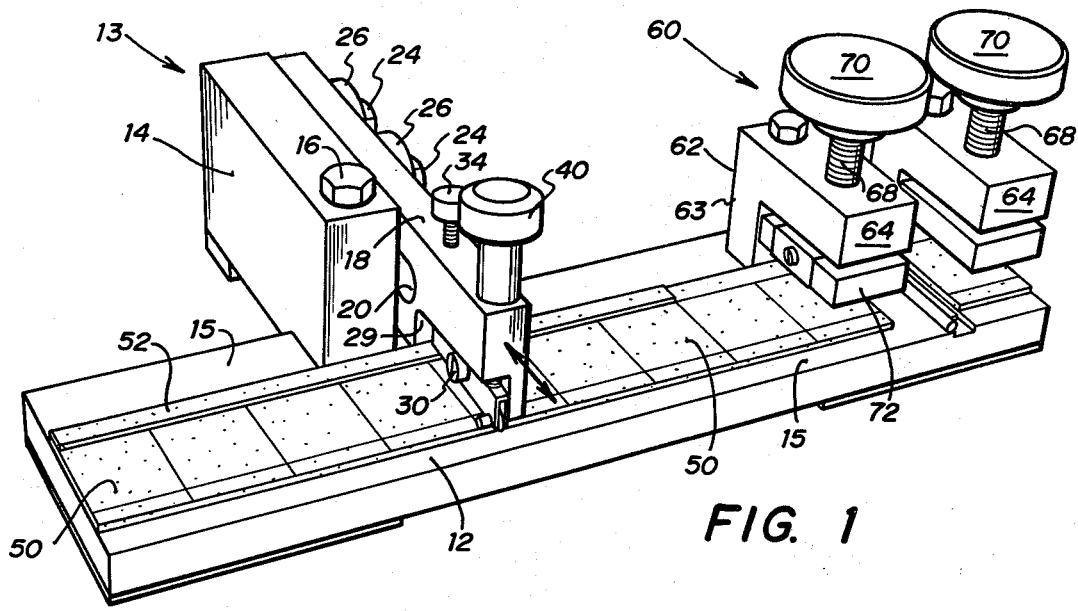
FIG. 1 is a perspective view of an apparatus in accordance with the invention which is designed to efficiently fabricate Ralph knives.

Referring initially to FIG. 1, the apparatus 10 includes an elongated base 12 which is preferably made of a rigid material such as a block of aluminum or stainless steel. Mounted on the base 12 are the two major operating components of the invention: a scoring apparatus 13 and a glass-breaking apparatus 60. Because the scoring apparatus is always used before the glass-breaking apparatus, it will be described first. Extending upwardly from the left portion of the block 12 is a pillar 14 which is rigidly connected to the base, as by bolt 16. The pillar 14 is relatively long in a transverse direction—in order to provide a substantial support for an adjustable scoring arm 18, and it has a machined and polished face 17 which is perpendicular to the longitudinal axis of the base 12.

Figure 2:
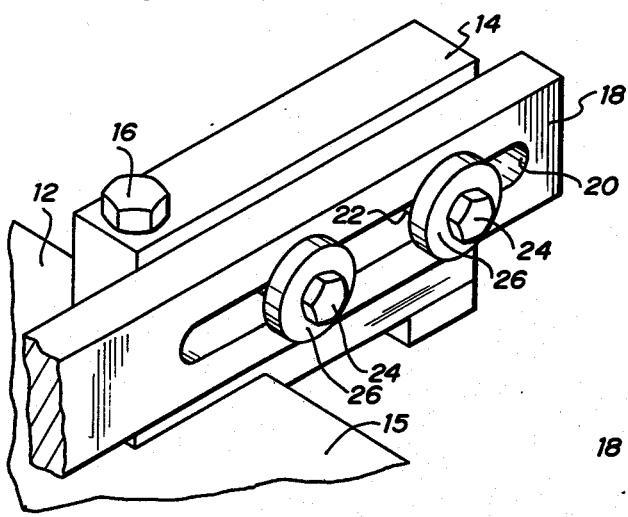
FIG. 2 is a fragmentary, perspective view of the glass-scoring apparatus, showing the rear end of the translating arm mounted on an upright frame.
Figure 8:
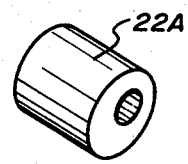

Referring additionally to FIG. 2, the scoring arm 18 has a central slot 20 which extends for a substantial portion of the length of the arm. The upper and lower edges of the slot 20 are both parallel and polished so as to provide smooth bearing surfaces for engagement by two fixed members 22. The members 22 are conveniently formed from hollow cylindrical stock having hardened and polished external surfaces which cooperate to hold the arm 18 next to the pillar 14 and insure that the arm will move smoothly across the base 12 during the step of cutting a score line on a glass surface. Thus, the outer diameter of the two rigid cylinders 22 is only slightly smaller than the height of the slot 20, such that there is a reasonably tight sliding clearance between the pieces 18 and 22. To permit any necessary adjustment that may be required, the internal diameter of at least one of the two cylinders 22 is relatively large in comparison to the diameter of the bolts 24 which secure the cylinders to the pillar 14. By selectively loosening a bolt 24, the elevation of at least one of the cylinders 22 may be adjusted with respect to the pillar 14, and the arm 18 may be positioned so that it moves in a plane that is exactly parallel to the top surface 13 of base 12. In effect, the combination of a mounting bolt 24 and a cylinder 22 whose elevation is adjustable constitutes a cam-like arrangement. (In another embodiment, an off-set hole through a solid cylinder provides a bearing member that looks more like a conventional cam; such a construction is shown as element 22A in FIG. 8.) Washers 26 or the like are employed to insure that the arm 18 is held snugly against pillar 24 as the arm makes its periodic excursions.

Figure 3:
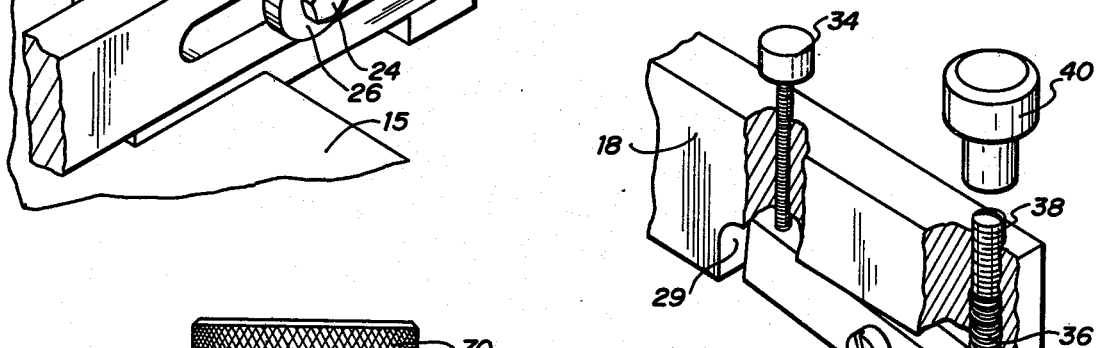
FIG. 3 is a fragmentary, perspective view of the forward end of the translating arm, taken from a direction about 90 degrees from that of FIG. 2.

Referring additionally to FIG. 3, an elongated recess 29 is cut into the bottom of the arm 18 at the distal end thereof, and a carrier bar 30 is pivotably mounted in the recess by virtue of bolt 32. The opening in carrier bar 30 through which bolt 32 passes is preferably located near the center of the bar, so that the bar may rock in a "see-saw" fashion with respect to the bolt 32. Near the interior end of carrier bar 30 there is provided an adjustable stop which is achieved with a bolt 34 inserted into a vertically threaded bore in arm 18. Thus, by turning the bolt 34 further into the threaded bore, more of the bolt will extend into the recess 29—until the bottom end of the bolt makes contact with the top surface of carrier bar 30 and forces it to rotate counterclockwise.

At the other end of carrier bar 30, and below another vertically threaded bore in arm 18, is a bearing surface against which bears a resilient member 36. Said resilient member 36 is preferably a coiled spring having a length of about 25 mm, a diameter of about 6.5 mm, and a spring constant of about 35 Kg/cm. The relatively high spring constant is preferred in order that a firm and steady pressure will be exerted downwardly on the forward end of the carrier 30 at all times. An initial compression of the spring 36 is established by threaded bolt 38 which has an exposed head that permits it to be turned at will—with a screwdriver or the like. The threaded bolt 38 also has external threads which are adapted to be engaged by internal threads on a knob 40—which is conveniently grasped by the operator in order to cause the arm 18 to move transversely with respect to the base 12. That is, the bolt 38 serves a dual purpose of adjusting the compression in spring 36 and providing a convenient way of affixing a knob 40 on top of the arm 18; furthermore, when the knob is secured so that it bears tightly against the top surface of the arm, it serves an additional function as a locking means for preventing the bolt 38 from turning during use.

At the most forward end of the carrier bar 30 is a U-shaped slot 42 which is sized to receive a hardened cutting means such as a conventional cutting wheel 44 that is journaled on a removable shaft 46. One way of making the shaft 46 removable is to provide a portion of its exterior with threads which mate with a threaded bore on the carrier arm 30. However, most any mounting arrangement would likely be satisfactory—as long as the wheel 44 is held steadily in the carrier 30 when it is moved across a piece of glass. And, the functional equivalent of a hardened wheel—such as a diamond or metallic carbide insert—should be understood to be within the scope of the expression "hardened cutting means".

Affixed to the top surface of the base 12 and extending longitudinally thereof is a planar support member 50, which preferably is made of a resilient material such as rubber whose surface characteristics will inhibit the easy sliding of glass thereacross. For example, a flat pad 50 made of neoprene rubber and having a thickness of about 1.5 mm, a width of about 4 cm, and a length of about 25 cm is quite adequate for the requirements of the apparatus 13. At the rear of the pad 50 is an elevated member or curb 52 which serves as a rear stop for positioning glass pieces with a proper orientation on the pad 50. The member 52 is preferably made of neoprene rubber or the like, so that it will have the characteristics of a resilient "bumper" as well as serving as an alignment device. The element 52 need not extend as high above the surface 15 as the glass is thick, but it should have a significant vertical face which is linear and perpendicular to the excursion path of the arm 18. In this way, a rectangular piece of glass will be steadily supported when it is forced backward against the bumper 52 as the arm 18 is pushed backward across the glass. And, no clamps or other physical restraining devices are generally needed in order to render the glass piece satisfactorily immobile while a scored line is being put on the top surface. According to this design, therefore, the resilient curb or bumper 52 serves multiple purposes in aligning the glass piece, restraining it against any tendency to move rearwardly as the scoring means pushes on it, and resiliently supporting it against any deleterious shocks. To inhibit any tendency of the base 12 to slide backward during the scoring operation, rubber pads are preferably affixed to the bottom of the base. Such non-skid pads are particularly advantageous when the major structural parts are made of aluminum; with such lightweight material used where possible, the entire apparatus 10 will weigh less than 3½ pounds.

Almost without exception, the hardened cutting means that bears downwardly against the glass surface will produce a uniform and smooth score line (or scratch) in the glass. But, if the score line is discovered to be too deep for a given piece of glass, it should be understood that the adjustment bolt 34 and/or the bolt 38 may be repositioned to control the pressure of the wheel 44 on the glass. Also, if the score line is deeper (or wider) at one side of the glass than it is at the other side, there is a possibility that the translating arm 18 is not moving parallel to top surface 15, and some attention should be given to a possible adjustment of the cylinders 22.

Figure 4:
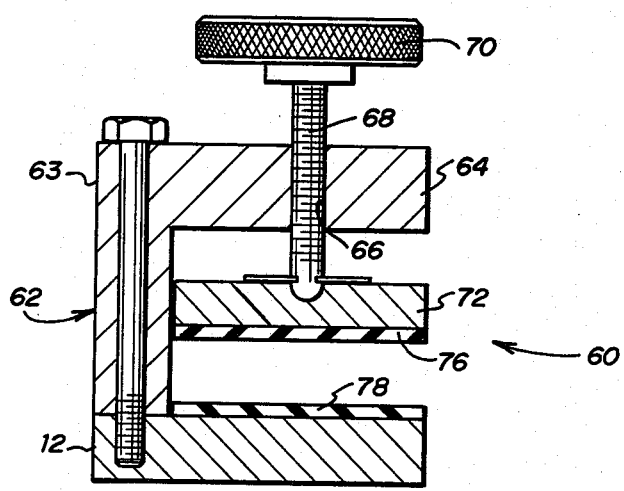
FIG. 4 is a cross-sectional, elevational view of one of the two C-shaped clamps which are adapted to fracture a piece of plane glass in order to produce a Ralph-type knife.
Figure 5:
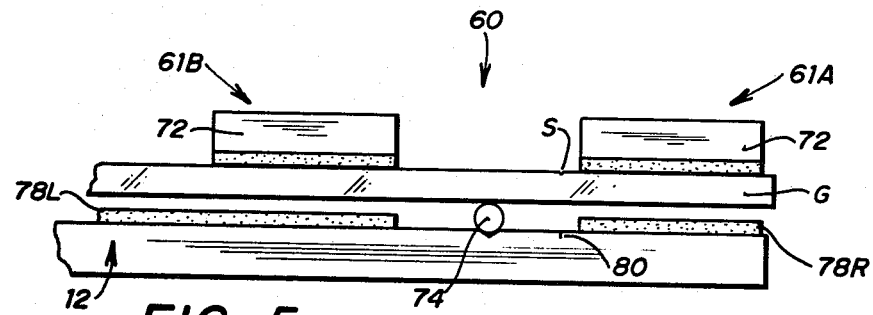
FIG. 5 is a frontal elevational view of certain parts of the glass-breaking apparatus, showing the relative position of the several elements just before the glass fractures.
Figure 6:
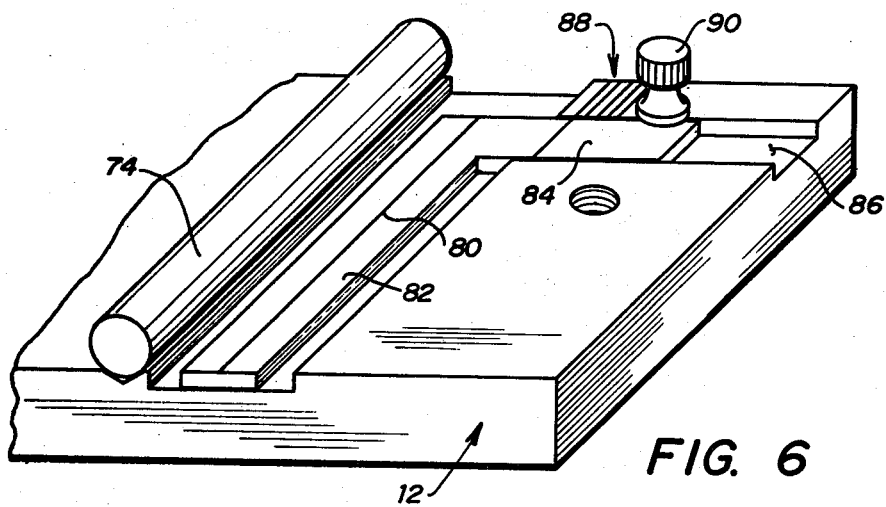
FIG. 6 is a perspective view of one embodiment of a movable index line which serves as the guide for proper positioning of a piece of glass.

Having now described the scoring mechanism 13, attention will be directed to the mechanical glass-breaking apparatus 60 which is adapted to convert properly scored glass pieces into Ralph-type knives. To facilitate use of both the scoring and glass-breaking devices, they preferably are combined in such a way that they share a common base. Thus, in the preferred embodiment, the glass-breaking apparatus 60 is on a remote end of the base 12 and preferably separated from arm 18 by at least 10 cm, so that a 20 cm strip of glass plate may be centered with respect to the scoring mechanism 13 without interfering in any way with structural parts of the breaking mechanism 60. Referring next to FIGS. 4 and 5, the breaker mechanism 60 consists of two identical clamping devices or vises which are shaped and positioned so as to receive a piece of glass through the open "mouth" of a C-shaped opening. This opening is established by an L-shaped structural member 62 which is securely fixed to the base 12 by a bolt or the like which extends through the vertical part 63 of the L-shaped member. The horizontal leg 64 of the L-shaped member 62 extends forwardly above the base 12 for a distance of about 4 cm from the frontal surface of the vertical member 63. In approximately the center of the horizontal extending leg 64 is a threaded bore 66 into which is threadably inserted a bolt 68. On the upper end of the bolt 68 a knurled knob 70 is secured, as with a set screw or the like, so that the bolt may be manually turned at will. The threads on bolt 68 are preferably equivalent to 3/16-18 threads, so that the bolt may be advanced in the threaded bore 66 smoothly but with some rapidity when the head 70 is turned.

Affixed to the lower end of bolt 68 is a flat pressure plate 72 which has a configuration that is similar to the horizontal portion 64 of the L-shaped frame. In a preferred embodiment, the pressure plate 72 has a width of about 2.5 cm and a length of about 4 cm. The plate is ideally affixed to the bottom end of bolt 68 with a swivel-type joint so that the plate has a substantial degree of freedom of movement with respect to the longitudinal axis of bolt 68. While a true "universal" joint might be advantageous in this particular construction, there may not be much of a requirement for plate motion about an axis parallel to the longitudinal axis of base 12. But there is a significant requirement for freedom of movement about an axis which is transverse to the longitudinal axis of base 12. This is because a fulcrum 74 is positioned on the base 12 at a location between the two frames 62; and, depending upon how a piece of glass is positioned over this fulcrum 74, there is a legitimate requirement that the respective pressure plates 72 have sufficient adjustability as to be essentially parallel to the top surface of the glass piece. (If the pressure plates 72 were not in intimate contact with a wide area of at least 6 $cm^2$ on the top surface of the glass piece, then there would be a strong likelihood of introducing a stress concentration in the glass which would contribute to an irregular breaking action.)

Affixed to the lower surface of the pressure plates 72 are rubber pads 76 of neoprene or the like, and similar mats 78 are affixed to the top of base 12 as to rest below the pads 76. The lower mats 78 are particularly beneficial in providing a cushioned surface against which a freshly broken glass knife may fall. Without the lower pad under the right press 61, the glass knife could possibly fall to the top of base 12—where its cutting edge would likely be ruined by contact with the metal base.

While the two breaking presses 61 are structurally identical, it will be convenient to refer to one of them as a "knife" press 61A and the other as a "stock" press 61B, in order to readily distinguish them in future descriptions. The knife press 61A is so called because it is closer to the alignment mark over which the scored line on the glass piece is positioned. Thus, the piece of glass which constitutes a serviceable microtome knife is always formed on that side of the fulcrum where the score line is placed; and, the opposite end of the glass will be serviceable as stock for forming a subsequent knife—if it has sufficient length. Hence, providing a resilient mat underneath the "stock" press 61B contributes to the protective handling of potentially useful glass pieces.

Positioned between the two presses 61A, 61B is a narrow and rigid member 74 which is adapted to serve as a fulcrum. This rigid member 74 extends perpendicular to the longitudinal axis of base 12, and is preferably secured firmly to the base so that it does not yield when a force is applied by the pressure plates 72 on the piece of glass. In a preferred embodiment, the fulcrum 74 constitutes a piece of hardened drill rod having a diameter within the range of about 3-5 mm and having a length of about 7 cm; it is positioned approximately midway between the two presses 61A, 61B. When the fulcrum is fixed, some variability in the production of knives is achievable by providing a movable index line 80. The line 80 is spatially adjustable by virtue or being fixed on the top of a movable plate 82, which is constrained to move in a direction parallel to the longitudinal axis of base 12 by arm 84 and matching groove 86. Index marks 88 on the fixed base 12 permit rapid and repetitive alignment of the index line 80 for glass of a particular thickness—when set screw 90 is temporarily loosened. To foster ease in aligning a piece of scored glass over the index mark, it is preferred that the top surface of the metal plate 82 be dark—and that the index line 80 be light. In practice, then, the operator will be positioning a piece of glass (whose score line S reflects light and appears brighter than the flat glass) over a bright index line 80.

In another embodiment, there is provided a fixed index mark and a plurality of surface grooves into which the fulcrum may be selectively positioned and temporarily glued. In still another embodiment, the fulcrum is fixed and a plurality of parallel index lines are machined or painted on the top surface 15. In this last embodiment, the operator must exercise more care in making sure that he uses the correct index mark for the particular thickness of glass that is being broken. (In general, the index line should be separated from the fulcrum by a distance which is about the same as the thickness of the glass.) While there is a greater chance for operator confusion when there are multiple index lines (even when they are color-coded), it is obviously more economical to provide fixed lines than to machine and install pieces that will permit a single index line 80 to be moved at will.

Figure 7:
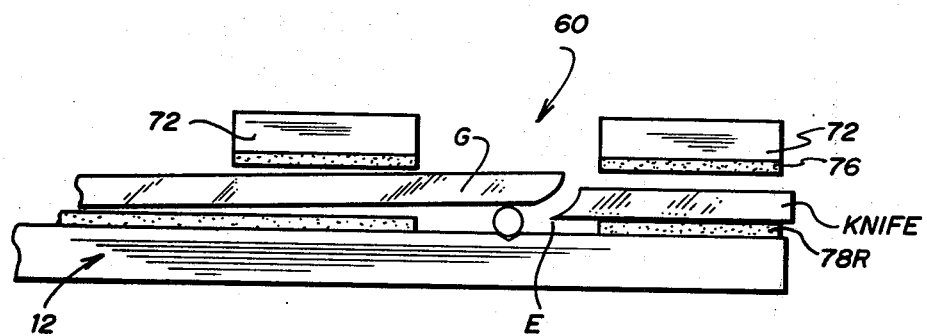
FIG. 7 is a frontal elevational view, similar to FIG. 5, wherein sufficient downward pressure has been exerted on the glass as to cause it to fracture—thereby producing a microtome knife.

To perhaps better explain the relationship between the fulcrum and the index mark, reference will now be made to FIGS. 5 and 7 which show how a knife edge is realized from the apparatus 10 described herein. Thus, with a piece of glass G positioned over a fulcrum 74 and a score line S directly over the index line 80, vertically restraining one end of the glass while slowly pressing down on the other end will strain the glass and force it to be fractured along a curvilinear surface that intersects the plane surface of the glass in a line generally parallel to the score line S and the fulcrum 74. In FIG. 7, the right portion of the broken glass will become a serviceable microtome knife, and the left portion is potentially serviceable as stock for making a subsequent knife. According to the techniques described in this invention, it is routinely possible to realize at least three microtome knives from a strip of glass about 20 cm long.

Perhaps it should be noted here that the offset between the score line S and the fulcrum 74 clearly distinguishes this apparatus 60 from those devices shown in the previously mentioned patents to Sutton, Blum, etc. That is, all of the previously mentioned patents for making Latta-Hartmann knives require the score line to be directly over the fulcrum; in contrast, the apparatus disclosed herein produces Ralph knives only when the score line is offset by a suitable distance.

In operation of the apparatus 10, the user will typically obtain a quantity of suitably annealed glass plate which is as clean as possible, and having a minimum size of about one inch by four inches. Glass having a thickness of $\frac{1}{4}$ inch is commercially available from many sources, and those skilled in the art will be aware of the parameters that make some glass pieces better than others. Ideally, the glass stock has a width of about 20 cm, and a length that is a whole-number multiple of the intended width of the glass knives. When the knives are to be about 2.5 cm long, a piece of good quality glass which is 20 cm by 20 cm will normally produce 24 knives, with three knives being typically obtained from each of eight strips (2.5 cm wide). As will be appreciated by those who have any experience with breaking glass, it is preferred to take the original 20×20 cm glass piece and break it into two halves, each 20 cm wide by 10 cm long. This is done in order that each break will be achieved between two pieces having approximately equal masses. (If an attempt is made to break a narrow piece off the edge of a much larger piece, there is a risk of introducing a curved break instead of a linear break; hence, it is always desirable to plan the use of a given piece so that each break will tend to be linear.)

After the 2.5×20 cm strips have been obtained, a first strip is laid on top of mat 50 and generally centered with respect to the carrier arm 30. A grid printed on top of mat 50 makes centering the long glass piece G relatively quick and easy. The glass piece G is also pushed gently against the front edge of curb 52, so that it becomes relatively immobile. The arm 18 is next positioned by pulling it forward manually, after making sure that bolt 34 is threaded into the arm 18 sufficiently as to cause the cutter wheel 44 to be elevated well above the top surface of the glass piece. That is, in pulling the wheel forward to its "start" position, there should be no interference between the wheel and the glass piece. To obtain a suitable elevation adjustment for the cutting wheel 44 during its forthcoming cutting stroke, the arm 18 is halted at a position such that the cutter wheel is just over the top of the front edge of the glass. The adjusting bolt 34 is then backed off slightly, so that the carrier arm 30 rotates clockwise and the cutter wheel 44 is lowered. At the position where the cutter wheel 44 makes contact with the top of the glass, the spring load on bolt 34 will be essentially eliminated; this is readily detected by the tactile "feel" of the bolt as it is rotated. The rotational orientation of the bolt 34 at the time that loading of the spring 36 has been transferred from the bolt to the glass is carefully noted; and the arm 18 is then pulled all the way forward, so that the cutter wheel 44 is well in front of the leading edge of the glass. Next, turning the bolt 34 approximately 180 degrees counterclockwise will cause the cutter wheel 44 to be lowered by an additional $\frac{1}{8}$ mm, which has been found to produce a satisfactory score mark when the wheel is subsequently forced backward over the glass.

The operator will then typically place the palm of his hand on top of knob 40, and push the arm 18 backward with a smooth, steady force. The cutting wheel 44 will thereby scribe what is customarily called a score line on the top of the glass piece, although some purist might insist that the "line" is nothing but a series of overlapped conchoidal pits. The suitably scored glass piece G will then be physically picked up and moved to a position wherein the score line S is in the general vicinity of and slightly to the right of fulcrum 74. The two knobs 70 are next turned clockwise so as to lower the pressure plates 72 more or less uniformly until they make gentle contact with the glass piece at two widely spaced locations. Also, it is advantageous that the two pressure plates 72 be at approximately the same elevation—in order that the glass piece G will be essentially horizontal over the fulcrum 74. The "floating" mounting technique for these pressure plates 72 insures that each plate (having an area of at least 6 cm$^2$) will provide a widely distributed load on the glass. Having achieved a suitable approximate position for the glass G, a "fine" adjustment is then accomplished by visually positioning the score line S directly above the index line 80. One of the two knobs 72 is then turned slightly so as to hold the glass G firmly in place. By continuing to turn either one of the knobs 70, an increasing degree of stress may be imparted to the horizontal glass until it fractures—with the fracture beginning on the top surface of the glass at the score line S and continuing downward through the glass at an angle of approximately 60 or 70 degrees. Of course, it is the intersection of the curvilinear surface with the flat bottom surface of the knife that creates the extremely sharp edge which constitutes the microtome knife edge.

For a piece of glass having a given thickness, the included angle between the face of the glass piece and the newly created curvilinear surface will be dependent somewhat upon the spatial location of the score line with respect to the fulcrum 74 before the breaking pressure was applied. In general, it is probably true that increasing the separation distance to a length that significantly exceeds the thickness of the glass will serve to reduce the included angle. (Most people are in agreement that a small angle is not good, because it reduces the supporting mass below the knife edge—and this may permit the knife edge to flex somewhat under heavy cutting loads.) For ¼ inch glass, an offset distance of about 6 mm will typically provide included angles between 70 and 80 degrees, over essentially the full 2.5 cm length of the knife. If the quality of the glass is reasonably good, and suitable care was exercised in achieving proper alignment (i.e., parallelism) between the index line 80 and the score line S, the knife edge should be not only linear but also perpendicular to the edge of the glass G.

As soon as the glass fractures, the right piece will fall freely to the resilient mat 78. The gap between the right mat 78R and the left mat 78L insures that there will be no physical contact between any structure and the newly created knife edge E. This may be clearly seen in FIG. 7, which shows the approximate position of the two glass pieces after fracture. The right piece of glass (which will be one-half the original piece, i.e., about 10 cm long) is then pulled forward out of the apparatus 60, and the knife edge E may be examined for its quality—including smoothness, uniformity, etc. From this right half of the glass strip, one other knife may be obtained, as will now be explained. The operator must first flip the glass over (side for side) so that the cutting edge E is now on top, and then position said piece centrally on the mat 78 below arm 18. The knob 40 would then be pushed rearwardly to create a fresh score mark transversely across the middle of the 10 cm piece of glass. (The reason for flipping the glass piece is to preclude contact between the mat 78 and the cutting edge which has already been achieved.) The 10 cm piece is then manually positioned between the two clamping devices 61 in the same manner that the 20 cm piece was clamped, with the new score line being just slightly to the right of the fulcrum 74. The same gripping, adjusting, stressing and breaking procedure would be followed, as described above. With the completion of this second break, two knives have been realized from one-half of the original 20 cm piece of glass. In each case, it should be noted that the freshly prepared cutting edge is always supported and/or positioned in such a way that it never comes into contact with any other structure which might damage the cutting edge or otherwise contaminate it.

Next, the remaining 10 cm piece (which was the left half of the original knife fabrication) may be suitably scored along a middle dividing line and subsequently stressed until it breaks. With an arrangement like that shown in FIG. 5, the right piece of broken glass will have the cutting edge on it, and the left piece will be categorized as either scrap or stock—depending upon its length. Because it takes about a 10 cm piece to create a knife in accordance with this invention, anything much less than 10 cm in length is probably best discarded. Hence, the original 20 cm strip of glass will produce three satisfactory cutting edges on glass pieces that are large enough to be handled in a routine manner. If there is any excess glass on a knife that would perhaps interfere with some part of the microtome apparatus, such extra material could be scored and broken off in accordance with customary laboratory practice; thus, glazier pliers similar to those described in U.S. Pat. No. 2,212,599 may be used to produce a knife having most any desired physical size.

In practice, it will normally be found that even an untrained person can quickly develop the ability to produce Ralph knives with the apparatus disclosed herein. People having only a modest amount of manual dexterity have been taught to repeatedly produce high-quality knives in appreciably less than 10 minutes. Accordingly, it should be apparent that a great deal of the "art" that previously had been involved in making microtome knives has been eliminated by the relatively simple structure described herein. Furthermore, if any imperfection should begin to appear in a series of knives because of, for example, a maladjustment of the scoring means, the remedy is within the grasp of the user—and the apparatus does not have to be returned to a factory for some complicated work by a skilled technician. By placing the adjustment means for arm travel in an exposed and readily accessible location, any esoteric properties of knife fabrication are largely eliminated. Furthermore, the apparatus 10 is compact and lightweight, without sacrificing any properties of being durable. But, even though the device is relatively simple in its construction, the quality of the knives it produces is reportedly superior to those knives which have been heretofore produced with manual techniques, etc.

While only the preferred embodiment (and a few modifications thereof) have been disclosed in great detail herein, it should be apparent to those skilled in the art that still additional modifications could be made without departing from the spirit of the invention. Accordingly, the invention should be understood to be as broad as the scope of the claims appended hereto.

I claimed:

1. The method of preparing a Ralph-type microtome knife, comprising the steps of:
   (a) placing a straight score line on the top surface of a piece of glass plate;
   (b) positioning the glass piece with its bottom surface in contact with a narrow and rigid member which is adapted to serve as a fulcrum, with the score line being positioned parallel to the fulcrum and being laterally separated from the fulcrum by a distance which is about the same as the thickness of the glass;
   (c) holding the glass piece against any sideward slipping after it has been correctly positioned with respect to the fulcrum; and
   (d) vertically restraining one end of the glass piece while applying a controlled mechanical force in a downward direction to the other end, in order to strain the glass piece and force it to be fractured along a curvilinear plane which intersects one surface in a line that is generally parallel to the fulcrum, and both the vertical restraint and the downward force being applied through pressure pads that are approximately as wide as the glass piece.

2. The method of preparing a microtome knife as claimed in claim 1 wherein one end of the glass is mechanically forced downward by manually turning a thumbscrew which has a pressure pad mounted on the end of the thumbscrew for contacting the top of said glass.

3. The method of preparing a microtome knife as claimed in claim 1 wherein the first end of the glass piece is vertically restrained by a floating member having a sufficient degree of movement as to avoid any uneven strain on the glass, whereby a linear fracture of the glass is more nearly assured.

4. The method of preparing a microtome knife as claimed in claim 1 wherein the position of the glass piece is manually adjustable with respect to the fulcrum prior to fracture, and the position of the score line is also adjustable with respect to the fulcrum, whereby the included angle within a given glass knife may be affected by changing the lateral separation distance between the fulcrum and the score line.

5. The method of preparing a microtome knife as claimed in claim 1 wherein the straight score line is placed on the top surface of the glass piece with a mechanical scoring apparatus, so that the variations in the depth of a score line which would normally attend manual scoring are avoided.

6. The method of preparing a microtome knife as claimed in claim 1 wherein the glass piece is about 2.5 cm wide, and wherein the vertical restraint on the first end of the glass piece and the downward force on the second end of the glass piece are both applied through an area of at least 6 square centimeters, such that any concentrated loads on the glass are avoided and the creation of a more nearly linear knife edge is fostered.

7. The method for preparing a microtome knife as claimed in claim 1 wherein the score line is placed on the top surface of a piece of glass with a mechanical scoring apparatus which applies a uniform scoring force against the glass plate throughout the entire length of the score line.

8. An apparatus for preparing a glass microtome knife of the Ralph-type, comprising:
 (a) a rigid base;
 (b) a scoring apparatus on one end of the base, including an arm capable of making straight excursions across the top of the base and parallel to the top surface thereof, with said arm carrying a hardened cutting means which is adjustable in height so as to produce a desired score line on a piece of glass supported by a mat on the base;
 (c) a glass-breaking apparatus affixed to the other end of the base, with said glass-breaking apparatus having a horizontal mat for catching and supporting broken pieces of glass, with the elevation of said supporting mat in the glass-breaker apparatus being identical to the elevation of a supporting mat in the glass-scoring apparatus, such that an elongated piece of resilient material may serve both the glass-scoring apparatus and the glass-breaking apparatus; and
 (d) the glass-breaking apparatus having a pair of similarly oriented and open-face clamps with movable pressure pads thereon, and there being a linear fulcrum fixed to the base between said pair of clamps, such that a piece of glass may be positioned in the two clamps and over the fulcrum in such a way that applying pressure with the two clamps can cause a glass piece to fracture along a line which is generally parallel to the fulcrum.

9. The apparatus as claimed in claim 8 and further including an index means for permitting the alignment of a piece of glass so that a straight score line on said glass is spaced from but exactly parallel to the linear fulcrum.

10. An apparatus for producing a scored line on a piece of glass plate, comprising:
 (a) a base having a horizontal surface with a size sufficient to fully support a piece of glass;
 (b) an upright frame having a planar face which is parallel to the direction of the desired score line;
 (c) a pair of mounting bolts fixed to the upright frame and arranged in spaced relation in a plane which is at least approximately parallel to the plane of the desired score line;
 (d) a movable arm adapted to be held adjacent the upright frame by a pair of mounting bolts, with said arm having an elongated slot whose width is at least as great as the diameter of the two mounting bolts, and the length of said slot being greater than the length of a desired score line;
 (e) a pair of hardened bearing members, each of which is held to the upright frame by respective ones of the pair of mounting bolts, and the size of said bearing members being such as to provide a tight sliding fit in the elongated groove of said movable arm, and at least one of said bearing members being vertically adjustable with respect to the upright frame, whereby the excursion direction of the movable arm may be altered in accordance with changes in the relative elevation of at least one of the pair of bearing members;
 (f) a hardened cutting means affixed to the distal end of the movable arm in such a position that a piece of glass supported below the movable arm may be scored by translation of said hardened cutting means over the glass; and
 (g) an exposed knob fixed to the movable arm and adapted to be contacted by a person's hand for causing manual translation of the movable arm along the line established by the two bearing members.

11. The apparatus as claimed in claim 10 and further including an elongated curb which is fixed to the rear of said base and extends in a direction perpendicular to the excursion path of the movable arm, and said curb having a vertical surface against which a piece of glass may be firmly pressed in order to render the glass immobile while a score line is being impressed thereon.

12. The apparatus as claimed in claim 10 and further including a pivotable member carried by the movable arm, with said pivotable member being mounted at the distal end of the movable arm at the lower portion thereof, and said pivotable member having mounted thereon said hardened cutting means for imparting a score line to a piece of glass.

13. The apparatus as claimed in claim 12 wherein a first adjustment bolt is threadably engaged with said movable arm, and the bore which receives said adjustment bolt being positioned such that the bolt can bear against the rotatable member in order to cause said member to rotate, and further including an adjustable compression member which bears against the rotatable member at the end which is opposite said adjustment bolt.

14. The apparatus as claimed in claim 10 wherein at least one of the hardened bearing members has an aperture which is offset with respect to the geometric center of said bearing member, such that said bearing member has the properties of a cam for use in adjusting the excursion direction of said movable arm.

15. A glass-breaking apparatus adapted for breaking microtome knives of the Ralph type, comprising:
 (a) a base having a generally horizontal upper surface, and having right and left ends;
 (b) a first upright structure fixed to and extending in a cantilevered fashion over the upper surface of the base near the right end thereof, and a second upright structure fixed to and extending in a cantilevered fashion over the horizontal surface near the left end thereof, and there being a gap of about 2.5 cm between the two upright structures;

(c) a rigid fulcrum comprising a hardened steel member lying between the two upright structures;

(d) an index line spaced from said fulcrum member but lying parallel thereto, and said index line being between the two upright members where it is visible to an operator in front of the apparatus;

(e) a pressure pad associated with each of the two upright structures, with each pressure pad being carried by a thumbscrew which is threadably engaged with the cantilevered portion of each upright structure, and said thumbscrews being independently adjustable so as to foster the horizontal placement of a piece of glass over the fulcrum; and (f) a resilient mat positioned generally below that pressure pad which is closer to the index line, and said mat being spaced a short distance away from the rigid fulcrum, whereby the glass knife that is realized from tightening the thumbscrews to the point of fracturing a piece of glass will cause said broken glass to fall to the resilient mat, and the separation of the mat from the rigid fulcrum will prevent the cutting edge of said glass from bearing against any structure.

16. The glass-breaking apparatus claimed in claim 15 wherein each pressure pad is affixed to the bottom of its respective thumbscrew in a manner so as to have a substantial degree of freedom to rotate about an axis parallel to the rigid fulcrum.

17. The glass-breaking apparatus as claimed in claim 15 wherein the fulcrum constitutes a piece of drill rod having a diameter within the range of about 3 to 5 mm.

18. The glass-breaking apparatus as claimed in claim 15 and further including means for adjusting the position of the index line with respect to the rigid fulcrum.

19. The glass-breaking apparatus as claimed in claim 18 wherein the fulcrum is fixed to the base and the index line is placed on top of a member which is movable with respect to the base.

* * * * *